3,194,613
HYDROSTATIC AIR BEARING FOR SUPPORTING A HYDROSTATIC MOTOR
Joseph P. Pierry, Park Ridge, and Howard E. Schulien, Montville, N.J., assignors to The Bendix Corporation, Teterboro, N.J., a corporation of Delaware
Filed Feb. 18, 1963, Ser. No. 259,067
3 Claims. (Cl. 308—9)

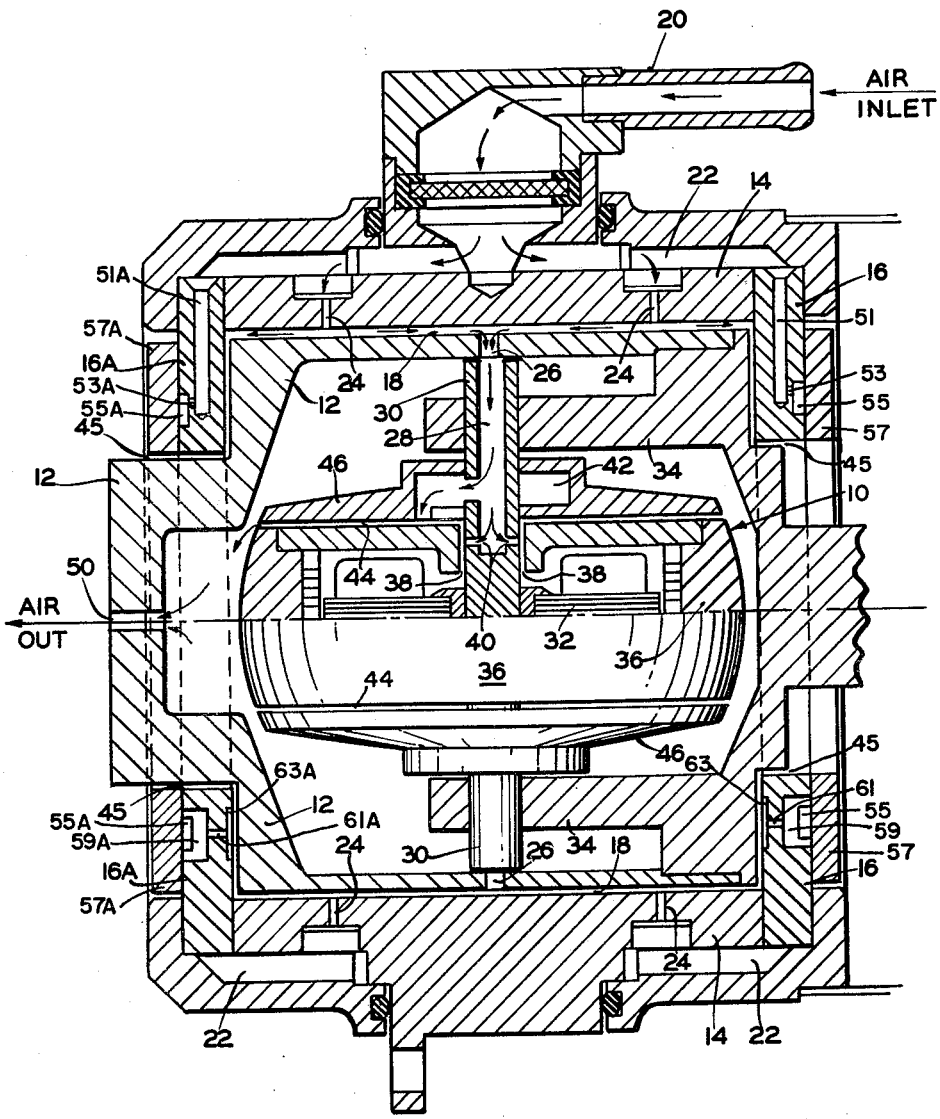

This invention relates to a hydrostatic air bearing for supporting a hydrostatic motor and more particularly to a novel arrangement of a hydrostatic air bearing which permits the use of static air in a center section of an air bearing cylinder to be utilized for support of a hydrostatic spin bearing gyro motor mounted within the air bearing cylinder.

An object of the invention is to provide a novel hydrostatic air bearing so arranged that static air in a center section of the air bearing cylinder may be utilized for support of a hydrostatic spin bearing motor mounted within the air bearing cylinder.

Another object of the invention is to provide a novel hydrostatic air bearing arrangement in which air from a compressed air reservoir is bled into an air bearing and in turn therefrom into a hydrostatic gyro motor so as to support the gyro motor during starting and normal running operation.

Another object of the invention is to provide a novel air bearing arrangement permitting static air from a reservoir in the air bearing to be bled into a hydrostatic gyro motor so as to support the gyro motor during starting and normal operation.

These and other objects and features of the invention are pointed out in the following description in terms of the embodiment thereof which is shown in the accompanying drawing. It is to be understood, however, that the drawing is for the purpose of illustration only and is not a definition of the limits of the invention, reference being had to the appended claims for this purpose.

In the drawing:
The drawing is a sectional showing of a hydrostatic motor mounted in operative relation within an air bearing cylinder which is in turn pivotally mounted in an air bearing.

Referring to the drawing, there is shown a hydro-static gyro motor 10 positioned within an air bearing cylinder 12 which is in turn pivotally mounted in an air bearing formed by a sleeve 14 and end plates 16 and 16A. An air gap 18 extends between the sleeve 14 and the bearing cylinder 12.

Static air pressure is supplied through an air inlet passage 20 to a passage 22 and through bleed passages 24 to the supporting air bearing gap 18 and is bled therefrom through a port 26 and passage 28 provided in a shaft 30 supporting a stator element 32 of the hydrostatic gyro motor 10. The shaft 30 is secured in and supported at opposite ends by arms 34 projecting from the inner surface of the air bearing cylinder 12.

The hydrostatic gyro motor 10 includes a rotor element 36 rotatable about the shaft 30 on air bearing 38. The rotor element 36 is cooperatively arranged in relation to the stator member 32 which is of a conventional electric motor structure so arranged as to drive the rotor element 36 upon electrical energization thereof.

The static air pressure supplied through the passage 28 of shaft 30 is bled through openings 40 to the air bearings 38 and the air pressure is further provided in end plates 46 affixed to the shaft 30 at opposite ends of the rotor elements 36 in spaced relation thereto. The passage 42 in turn opens to hydrostatic load pressure gaps 44 between the end plates 46 and the rotor element 36.

Thus, the static air pressure applied through the shaft 30 effects a pressurized air carrying film for the hydrostatic motor 10, as shown in the drawing.

Air then at a designated pressure is applied through the air bearing assembly so as to pass through a series of orifices 24 in the sleeve 14 prior to entering the air gap 18. As the air enters the gap 18, it flows in all directions so that the air which flows towards an exit opening 45 at the outer edge of the gap 18 vents to the atmosphere while the air that flows toward the center of the air bearing sleeve 14 forms a static pressure area around the opposite air borne ends of the inner cylinder 12. This static air pressure is in turn bled through the port 26 into the passage 28 of the gyro motor shaft 30 and passes into the hydrostatic load supporting pressure gaps 38 and 44. The air exhausts at the outer edges of the gap 44 into the air bearing cylinder 12. The air pressure supply is sufficient to support on air bearing films formed in gaps 38 and 44 the gyro rotor 36 prior to excitation of the motor element 32 and which air bearing films provide support for the rotor 36 during normal operating or running conditions of the motor 10. A port 50 in the wall of the air bearing cylinder 12 permits the air within the cylinder 12 to exhaust to the atmosphere.

It will be further seen that the air under pressure in the passage 22 is supplied through radial passages 51 and 51A in the end plates 16 and 16A to bleed passages 53 and 53A leading to passages 55 and 55A respectively in the end plates 16 and 16A. The passages 55 and 55A are sealed by cover plates 57 and 57A fitting tightly on the end plates 16 and 16A respectively. The passages 55 and 55A in the end plates 16 and 16A open into counter bores 59 and 59A respectively provided in the end plates 16 and 16A. The counter bores 59 and 59A are in turn connected by bleed passages 61 and 61A to counter bores 63 and 63A provided in the end plates 16 and 16A and opening to the air gap 18 which supports the inner air bearing cylinder 12 under thrust in the air bearing assembly.

It will be seen from the foregoing that there has been thus provided a novel arrangement whereby static air of an air bearing assembly may be utilized for the support of a hydrostatic spin bearing in an arrangement in which the connecting gaps 38 and 44 permit the supplied static air to flow without the introduction of friction, or cross torques about the spin axis of the gyro motor 10.

Furthermore, the arrangement is such that the connecting bleed line permits the static air from the sensitive air bearings to flow to the hydro-static spin bearings without introducing mechanical or dry friction.

Although only one embodiment of the invention has been illustrated and described, various changes in the form and relative arrangement of the parts, which will now appear to those skilled in the art may be made without departing from the scope of the invention. Reference is, therefore, to be had to the appended claims for a definition of the limits of the invention.

What is claimed is:
1. The combination comprising a sleeve, a cylinder pivotally mounted within the sleeve in spaced relation thereto, port means for supplying air under pressure to the space between the cylinder and the sleeve to form a first film of air for bearing the cylinder in said sleeve, a hollow shaft having an outer surface, said shaft being positioned within and supported by said cylinder, a rotor formed with an inner surface positioned concentrically with the outer surface of said shaft and in spaced relation thereto, port means in the cylinder for communicating the space between the cylinder and sleeve with the interior of the hollow shaft for introducing air under pressure into the hollow shaft, port means opening from the hollow shaft for directing air under pressure from the hollow shaft into the space between the inner surface of the rotor and the hollow shaft so as to form a second air bearing film between the rotor and the shaft.

2. In a gyroscope, the combination comprising a sleeve, a cylinder pivotally mounted within the sleeve in spaced relation thereto, port means for supplying air under pressure to the space between the cylinder and the sleeve to form a first film of air for bearing the cylinder in said sleeve, a hollow shaft having an outer surface, said shaft being positioned within and supported by said cylinder, a rotor formed with an inner surface positioned concentrically with the outer surface of said shaft and in spaced relation thereto, port means in the cylinder for communicating the space between the cylinder and sleeve with the interior of the hollow shaft for introducing air under pressure into the hollow shaft, port means opening from the hollow shaft for directing air under pressure from the hollow shaft into the space between the inner surface of the rotor and the hollow shaft so as to form a second air bearing film between the rotor and the shaft, members mounted on the shaft and positioned at opposite ends of the rotor in spaced relation thereto, port means in each of said end members for directing air under pressure from the hollow shaft into the space between the rotor and each of said end members so as to form third air bearing films therebetween, said first film of air bearing the cylinder in pivotal relation to the sleeve and said second and third films of air bearing the rotor in rotatable relation to the shaft and end members.

3. In a gyroscope, the combination comprising a sleeve, a cylinder pivotally mounted within the sleeve in spaced relation thereto, port means for supplying air under pressure to the space between the cylinder and the sleeve to form a first film of air for bearing the cylinder in said sleeve, a hollow shaft having an outer surface, said shaft being positioned within and supported by said cylinder, a rotor formed with an inner surface positioned concentrically with the outer surface of said shaft and in spaced relation thereto, port means in the cylinder for communicating the space between the cylinder and sleeve with the interior of the hollow shaft for introducing air under pressure into the hollow shaft, port means opening from the hollow shaft for directing air under pressure from the hollow shaft into the space between the inner surface of the rotor and the hollow shaft so as to form a second air bearing film between the rotor and the shaft, members mounted on the shaft and positioned at opposite ends of the rotor in spaced relation thereto, port means in each of said end members for directing air under pressure from the hollow shaft into the space between the rotor and each of said end members so as to form third air bearing films therebetween, said first film of air bearing the cylinder in pivotal relation to the sleeve and said second and third films of air bearing the rotor in rotatable relation to the shaft and end members, said cylinder including a port opening the interior of the cylinder to atmosphere, and electric motor means carried by the shaft for rotatably driving the rotor on the shaft.

References Cited by the Examiner
UNITED STATES PATENTS

| | | | |
|---|---|---|---|
| 2,940,318 | 6/60 | Adams et al. | 74—5 |
| 2,969,680 | 1/61 | Linn et al. | 74—5 |
| 3,070,407 | 12/62 | Hughes | 308—9 |

ROBERT C. RIORDON, *Primary Examiner.*

FRANK SUSKO, *Examiner.*